US006839422B2

(12) United States Patent
Williams et al.

(10) Patent No.: US 6,839,422 B2
(45) Date of Patent: Jan. 4, 2005

(54) METHOD AND APPARATUS FOR PROVIDING LOCAL CALL TREATMENT DISCRIMINATION FOR SELECTED CALLS ON A SWITCHED TELEPHONE NETWORK

(75) Inventors: L. Lloyd Williams, Kanata (CA); Alexander Markman, Thornhill (CA); David Edward Johnston, Whitby (CA)

(73) Assignee: NewStep Networks, Inc., Ottawa (CA)

( * ) Notice: Subject to any disclaimer, the term of this patent is extended or adjusted under 35 U.S.C. 154(b) by 249 days.

(21) Appl. No.: 10/198,551

(22) Filed: Jul. 18, 2002

(65) Prior Publication Data

US 2004/0013255 A1 Jan. 22, 2004

(51) Int. Cl.[7] ............................................... H04M 7/00

(52) U.S. Cl. ............................. 379/221.08; 379/221.09; 379/221.1; 379/220.01

(58) Field of Search .......................... 379/221.08, 221.09, 379/221.1, 220.01, 219, 221.01

(56) References Cited

U.S. PATENT DOCUMENTS

| | | | | |
|---|---|---|---|---|
| 120,553 | A | * 6/1871 | Williams | ...................... 705/26 |
| 4,191,860 | A | 3/1980 | Weber | ....................... 179/18 B |
| 5,432,845 | A | 7/1995 | Burd et al. | .................. 379/210 |
| 5,940,008 | A | 8/1999 | Kirkby | .................. 340/825.79 |
| 6,493,444 | B2 | * 12/2002 | Williams | ............... 379/221.08 |

* cited by examiner

*Primary Examiner*—Creighton Smith
(74) *Attorney, Agent, or Firm*—Van Dyke, Gardner & Burkhart, LLP (57) ABSTRACT

A method and apparatus for efficiently utilizing resources in a switched telephone network by providing call treatment at the closest available resource to the calling party preventing holding up network connection through to the terminating location if resources are not available at call termination equipment to handle a call. The selected calls are locally parked pending the availability of service termination resources to handle the call. The availability of service resources at the termination is determined before a selected call is extended through the network. Advantageously while the call is parked call treatment discrimination can be performed.

39 Claims, 8 Drawing Sheets

METHOD AND APPARATUS FOR PROVIDING LOCAL CALL TREATMENT DISCRIMINATION FOR SELECTED CALLS ON A SWITCHED TELEPHONE NETWORK

CROSS-REFERENCE TO RELATED APPLICATIONS

This is the first application filed for the present invention.

MICROFICHE APPENDIX

Not applicable.

TECHNICAL FIELD

This invention relates to communications call routing through a switched telephone network and, in particular, to a method and apparatus for providing local call treatment discrimination for selected calls in a switched telephone network.

BACKGROUND OF THE INVENTION

The introduction of toll-free telephone service, as well as other mass calling services in the public switched telephone network (PSTN) has revolutionized the way in which the telephone network is utilized and the way in which many business services are provided. It is now estimated that on a typical day, 30–40% of all long distance calls are toll-free telephone calls. Most toll-free telephone calls are made to call centers where call handling agents having appropriate skills deal with callers. Such call centers may provide product support, retail marketing, consumer information, or any number of other services required to efficiently conduct business. Many automated toll-free services are also provided, including retail sales, telephone banking, and the like.

A great deal of inventive ingenuity has been directed to automating and improving the efficiency of call center equipment, and to ensure that calls are rapidly and efficiently handled. For example, call center controllers (CCCs), such as Automatic Call Distributors (ACDs), receive calls, automatically discriminate the service required by the caller, and select a termination for the call. The call center controllers may distribute calls based on agent availability and skill set, as well as other factors. Consequently, the number of agents available to handle calls is reduced. As a result, however, calls must be parked at the call center controller during peak periods when no agent is available to respond to a particular call. Consequently, thousands of network minutes are consumed daily by calls completed to toll-free numbers where no resources are available to handle the call at the time of completion. Since such calls tie up network resources in an unproductive way that is expensive for the service subscriber and potentially blocks other calls which could be completed through the network using facilities occupied by inter-exchange circuits, it is desirable to have some mechanism for controlling the number of calls completed to selected network terminations so that unproductive call completions are minimized and network facilities are thereby made available for other call completions.

One method of exercising such control is proposed by Weber in U.S. Pat. No. 4,191,860, which issued on Mar. 4, 1980. Weber proposed that the busy/idle status for lines to toll-free call stations be stored at a network control point responsible for providing network routing information so that calls to the toll-free station could be blocked if all lines were busy. The busy/idle data was to be sent by common channel signaling messages (transaction capability application part messages) to the network control point. This solution, however, proved to be impractical and, to the best of Applicant's knowledge, was never implemented in the network.

Consequently, there exists a need for a method and apparatus for providing local call treatment discrimination for selected calls in a switched telephone network.

SUMMARY OF THE INVENTION

It is an object of the invention to provide a method for locally discriminating call treatment for selected calls in a switched telephone network to prevent the selected calls from being parked at a call termination if resources are not available at the call termination to handle the call. Toll-free calls represent one exemplary application of the technology embodied in this invention.

One aspect of the invention provides an apparatus for locally discriminating call treatment for selected calls in a switched telephone network so that the calls are not extended through the network unless resources are available at the termination to handle the calls.

Another aspect of the invention provides a method and apparatus for locally parking selected calls awaiting the availability of resources at a termination for the calls.

A further aspect of the invention provides a method and apparatus for making available parked caller information that would have been available if the caller were parked on enterprise equipment or in an Automatic Call Distributer.

In particular, the invention provides a method for providing local call treatment discrimination for selected calls in a switched telephone network, comprising steps of:

selecting a directory number to which local call treatment discrimination is to be applied;

configuring the network to route call control messages associated with the directory number to a call control node that is a virtual switching node in the switched telephone network;

determining at the call control node, on receipt of a call establishment message associated with a call to the directory number, a service resource to which the call should be routed; and sending into the network from the call control node, a call control message to route the call to the service resource.

The invention is enabled by an apparatus for providing local call treatment discrimination for calls addressed to a selected directory number in a switched telephone network, comprising:

at least one local service resource associated with each local calling area in the switched telephone network; at least one local service resource being adapted to communicate with callers to selected directory numbers;

at least one enhanced integrated services digital network-user part (EISUP) trunk in each of the local calling areas, having associated linksets and routesets to route call control messages associated with the selected calls to the call control node.

The invention therefore provides a method and apparatus for local call treatment discrimination for selected calls in a switched telephone network. In accordance with the invention, calls placed to selected directory numbers are routed over enhanced Integrated Services Digital Network User Part (ISUP) voice-grade trunks which are enhanced with routesets and linksets that route call control messages associated with the calls to a call control node in the switched telephone network. The call control node is thereby enabled to assume control of the call and route the call to an available service resource adapted to service calls associated with the directory number. If a service resource is not available at the call termination, the call can be routed to a local service resource, which may be, for example, an interactive voice response unit (IVR). The term IVR is used generically and is intended to include Generic Switch Announcements, Intelligent Peripherals or Service Nodes with enhanced functions having an ability to play messages, music, prompts or text-to-speech and may be provisioned to provide advanced control functions using speech recognition and speaker verification. The IVR can be programmed to commence an interactive session with the caller to enable call treatment discrimination. For example, the IVR may guide the caller through a series of menu selections to determine the purpose of the call and the service requirements of the calling party. This information is used to determine an appropriate termination for the call. After an appropriate termination for the call is determined, the information is relayed to the call control node, which determines a status of resources at the call termination.

The information relayed to the call control node is preferably relayed through a data network that is independent of a call control signaling system of the switched telephone network. On receipt of a call establishment message for the call, the call control node determines whether resources are available at the termination to handle the call. If resources are available, the call control node formulates and sends call control messages to complete the call to the termination. If resources are not available, the call control node selects a local service resource and sends a Call Park message through the data network to inform the local service resource that the call will be parked pending the availability of resources at the call termination. The call control node also issues call control messages into the call control signaling network to establish a connection to the local service resource. On receipt the Call Park message, and the correlated call, the service resource responds by playing a pre-recorded audio message to the caller. It is also possible to park the call at a switch resource capable of playing a generic prompt based on a predetermined number contained in the call control signaling message. The pre-recorded audio message is preferably selected by the service subscriber to which the call is directed, and is indistinguishable to the caller from a message that would be provided if the call were parked at a call center controller, or the like, at the call termination. Depending on how long it takes to determine availability of resources for the call at the termination, and how the call is discriminated, the call may be temporarily parked at the local service resource prior to determining the availability of resources. Specifically, if caller input is required to determine a termination for the call, or the expected time taken to determine the availability is too great to leave the call incomplete, the call is first terminated to the local service resource.

In an alternate embodiment, the calls are routed directly to the call termination by the call control node. Service discrimination and resource availability determination are performed by call termination equipment. If resources are not available to serve the call, a data message is sent to the call control node requesting that the call be parked, pending termination resource availability. The call control node responds to the data message by formulating and sending a call release message to release the call connection between the call control node and the call termination. The call control node then formulates and sends a call establishment message to connect the caller to a local service resource where the call is parked. When a termination service resource becomes available, the call termination equipment sends a message to the call control node requesting that the parked call be forwarded. The call control node responds by formulating signaling messages to release the call from the local service resource and reconnect the call to the call termination resource.

The methods and apparatus in accordance with the invention are preferably provisioned using an enhanced application telephone network as described in Applicant's co-pending U.S. patent application Ser. No. 09/268,843 which was filed on Mar. 16, 1999 and is incorporated herein by reference.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

The invention provides a method and apparatus for local call discrimination for calls in a switched telephone network. In accordance with the method, calls placed to selected directory numbers are routed to enhanced Integrated Services Digital Network-User Part (ISUP) voice-grade trunks so that associated call control messages are routed to a call control node, which is a virtual switching point in the switched telephone network.

In accordance with a first embodiment of the invention (see FIGS. 2a,b), the call control node queries service termination equipment to determine whether service termination resources are available to handle the call. If so, the call is forwarded through the network to the service termination equipment. If not, the call is parked at a local service resource until service termination resources become available.

In accordance with a second embodiment of the invention (see FIG. 3), calls to the selected directory numbers are initially passed straight through the call control node to the service termination equipment. Service discrimination is performed at the service termination equipment and if service termination resources are not available to serve the call, a data message is sent to the call control node to request that the call be released and parked at a service resource that is local to the calling party.

In accordance with a third embodiment of the invention (see FIGS. 4–6), the call control node assumes control of the selected calls and routes the calls to a selected local service resource, such as an Interactive Voice Response Unit (IVR), which is programmed to interact with the calling party to discriminate a type/level of service required for the call. After the local service resource has obtained and analyzed information from the caller needed for discrimination, the availability of resources at the service termination equipment deemed to be appropriate to the calling party, is determined. The IVR may determine the availability of resources in different ways, depending on particular instantiations of the invention. To name a few examples: the IVR may exchange messages over a data network with the service termination resource (or an automated call distributor that represents one or more such service termination resources) directly; the IVR may simply send the type/level of service information over the data network to the service termination resource (or automated call distributor), and await a response that indicates both availability and routing information pertaining to the call; or the IVR may exchange signaling with the call control node that performs the availability determination. It is also possible that the IVR-type resource is not aware of the status of resources and simply provides generic information based on the number presented to the resource on initial routing.

Figure 4:
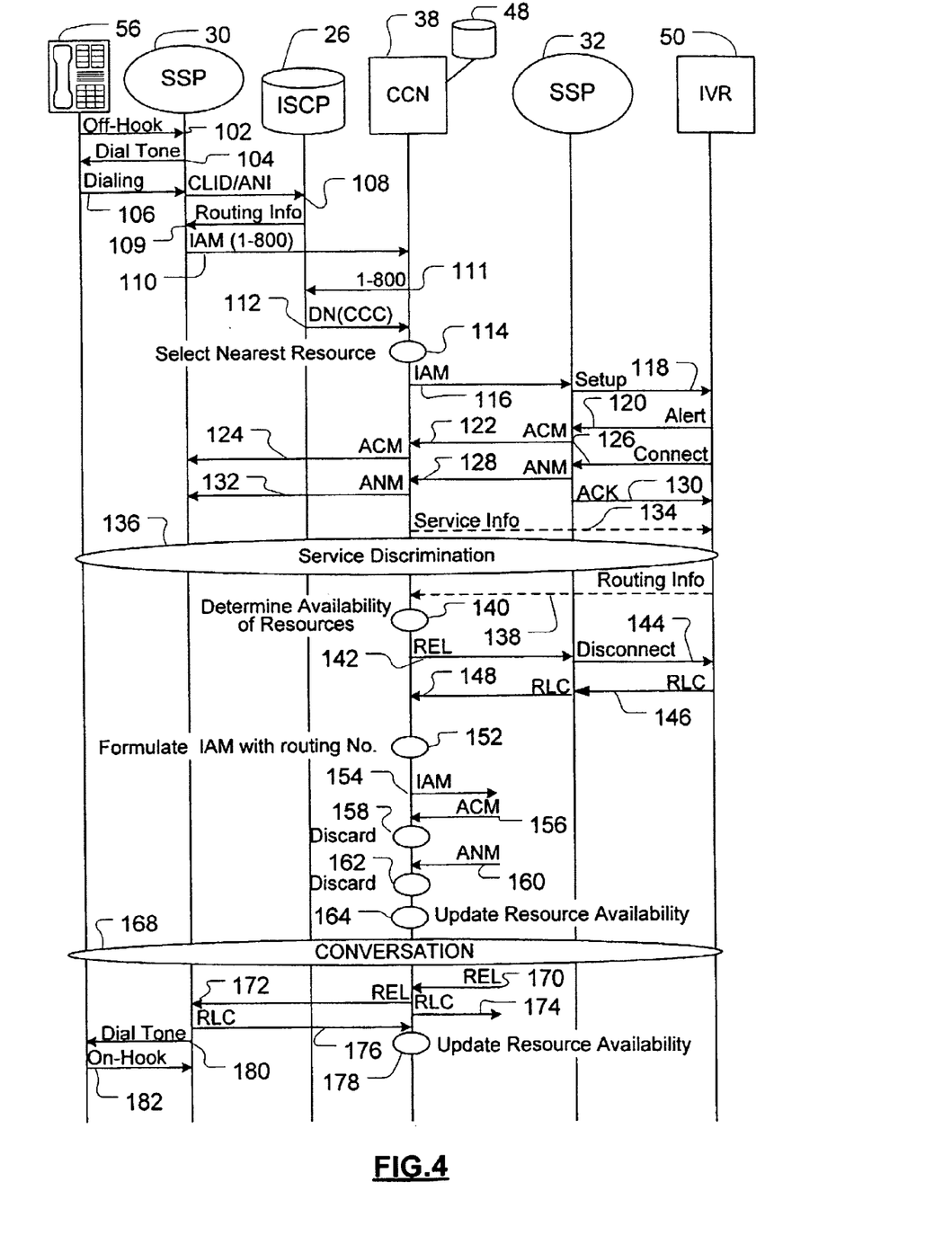
FIG. 4 is a call progress diagram showing principal steps involved in the call treatment and service discrimination of a call when resources are available at a service provider's facilities, in accordance with another embodiment of the invention.
Figure 5:
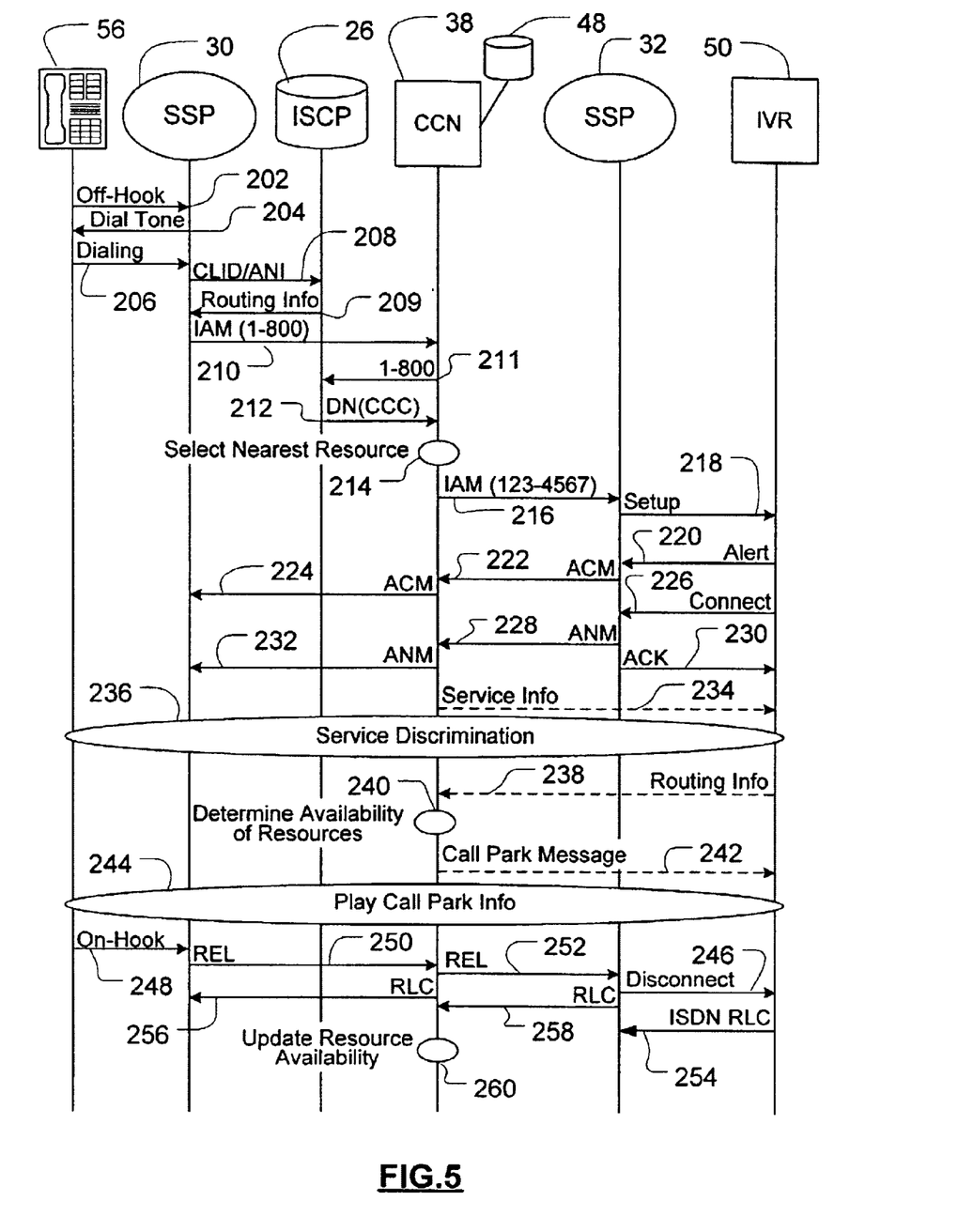
FIG. 5 is a call progress diagram showing an example of principal steps involved in the call treatment and discrimination of a toll-free call when resources are not available, and the caller hangs up after the call is parked.
Figure 6:
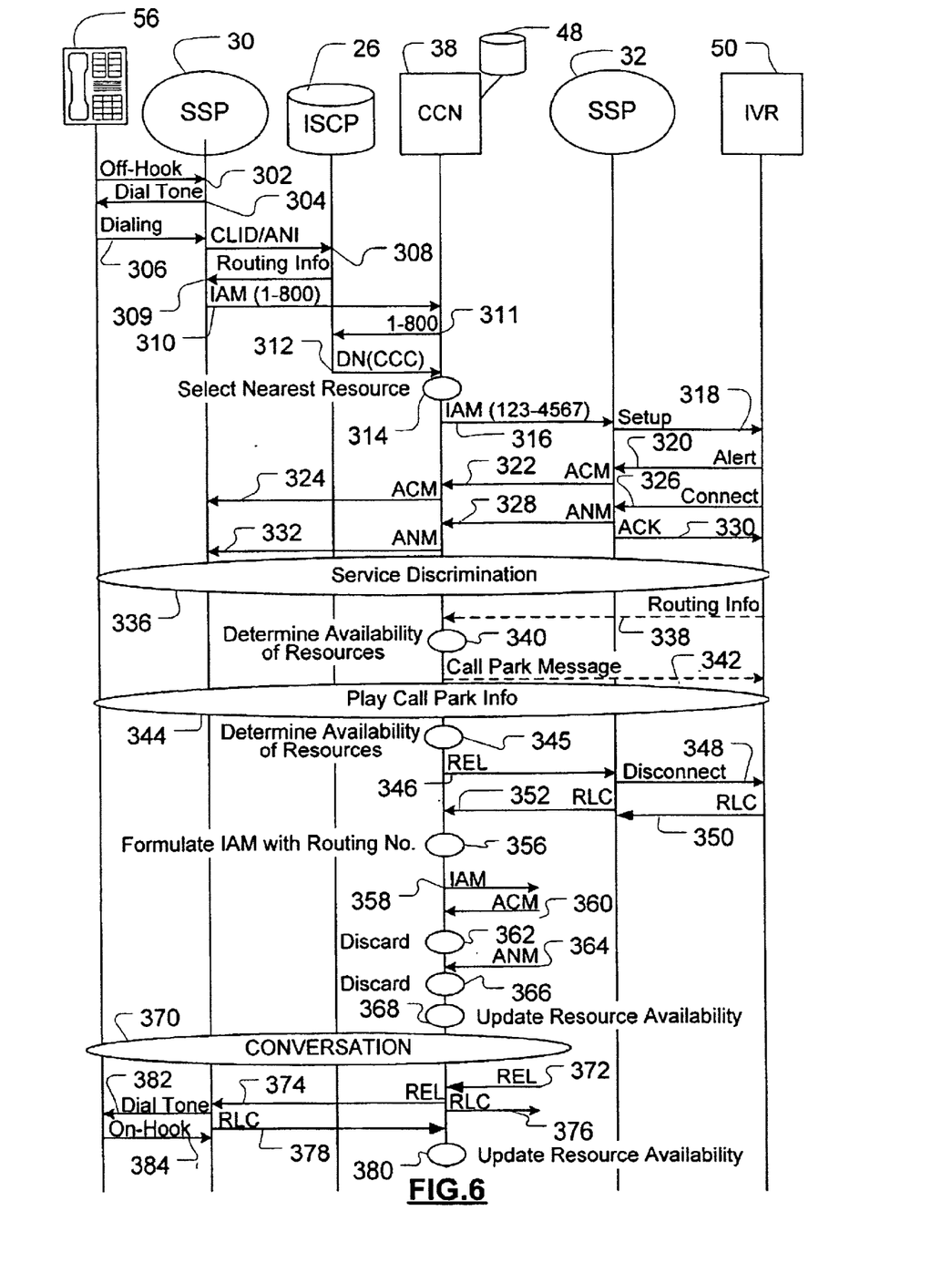
FIG. 6 is a call progress diagram showing an example of the principal steps involved in the call treatment and discrimination of a toll-free call when resources are not available, but the caller waits for a connection after the call is parked.

If resources are available at the service termination equipment, the call control node and/or the local service resource initiates a signaling sequence to release the call from the IVR and complete the call to the service termination equipment. If resources are not available at the service termination equipment, the IVR is informed and requested to play a call park announcement. The call park announcement may be included in a message that requests the message to be played, it may be a generic message played independently of the called number and call discrimination, or the IVR may be able to determine a selection to play in response to a redirect number inserted into the call establishment message used to connect the caller to the IVR, for example. When resources become available at the service termination equipment, the call control node and/or IVR releases the call connection between the IVR and the call control node, and initiates a signaling sequence to re-complete the call to the available resource.

Figure 1:
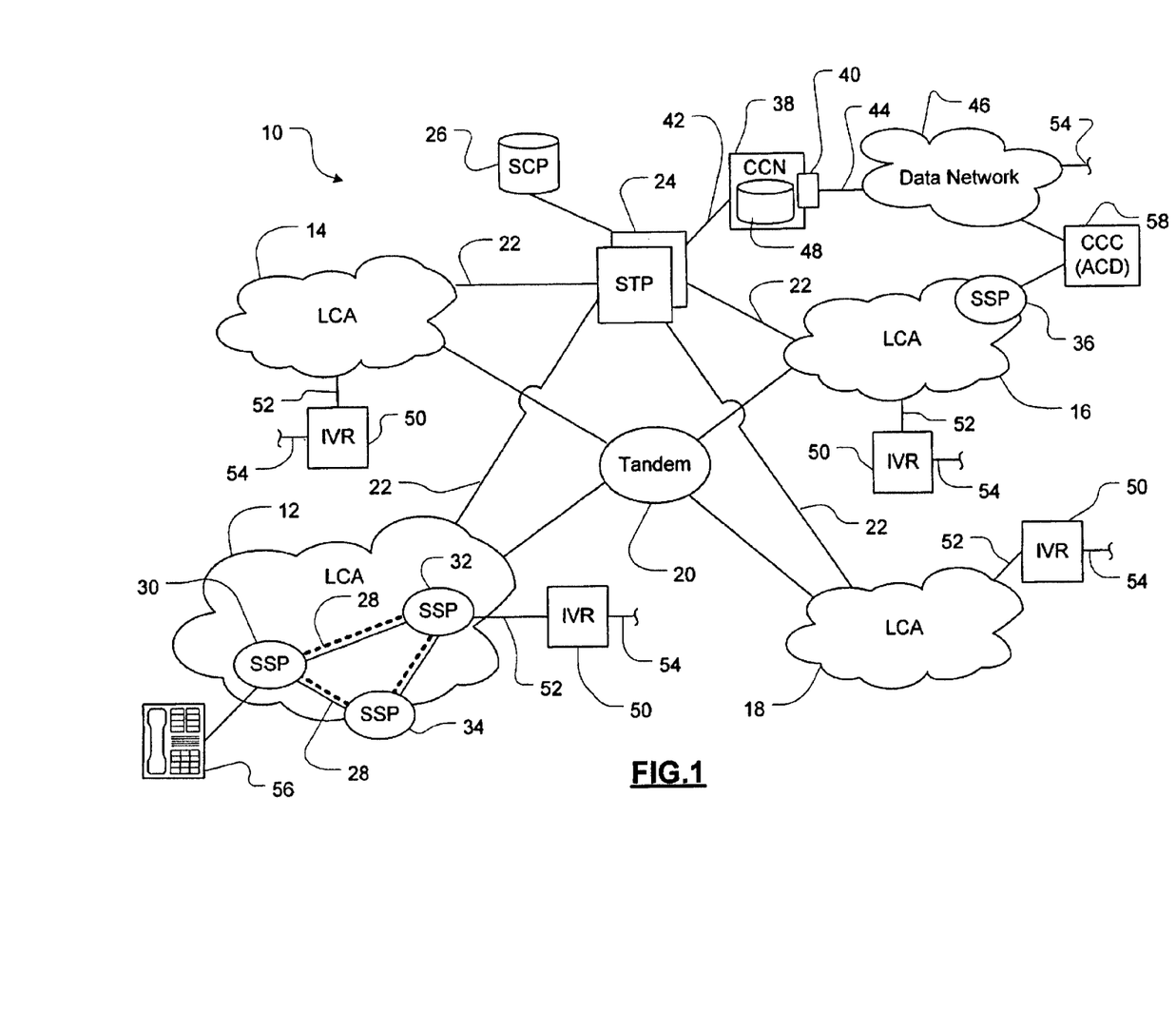
FIG. 1 is a schematic diagram of a portion of a Public Switched Telephone Network (PSTN) configured in accordance with the invention.

FIG. 1 is a schematic diagram of a portion of a Public Switched Telephone Network (PSTN) 10 configured in accordance with the invention. As is well understood in the art, the PSTN 10 is organized in a plurality of Local Calling Areas (LCAs) 12, 14, 16 and 18 which are, in turn, connected to a plurality of tandem switches 20, only one of which is shown for the sake of simplicity. Each LCA includes a plurality of Service Switching Points (SSPs); only four (30, 32, 34, 36) are shown. Each SSP has a line side to which subscriber local loops are connected and a trunk side to which other SSPs are connected in a manner well known in the art. Communication between SSPs and other signaling elements in the PSTN 10 is provided by a call control signaling network, typically a Signaling System 7 (SS7) packet network which includes signaling links 22 to Signal Transfer Points (STPs) 24 (only one redundantly paired STP 24 illustrated). Required signaling links between to each SSP and the STP 24 have not been shown for simplicity of illustration. The PSTN 10 is preferably an Enhanced Application Network (EAN) described in Applicant's co-pending United States patent application referred to above. In the EAN, a plurality of Enhanced ISUP (EISUP) (voice-grade) trunks 28 interconnects pairs of SSPs such as all three pairs of the SSPs 30, 32 and 34. The apparatus in accordance with the invention further includes a Call Control Node (CCN) 38, which is connected by a signaling link 42 to the STP 24. The CCN 38 also supports a data interface 40 (via a network connection 44) to the data network 46. The CCN 38 includes a memory 48 for storing information about each call in progress, including a status of each call, and preferably also information about service resources and their respective availabilities. The apparatus in accordance with the invention further includes a plurality of IVRs 50, which are preferably distributed across the PSTN 10 so that each LCA includes at least one IVR 50 to serve as local service resources in accordance with the present invention. The IVRs 50 are connected to respective SSPs of respective LCAs by respective trunks such as Integrated Service Digital Network (ISDN) Private Rate Interface (PRI) 52 or a Small Message Desk Interface (SMDI) 52, in a manner well known in the art. Each IVR 50 also supports a data interface to which a data link 54 is connected for providing the IVR with access to the data network 46.

A call center controller (CCC) 58 is also connected to the data network 46, and adapted to exchange messaging with at least one of the CCN 38 or the IVRs 50, whichever is responsible for initiating call prompting with announcements or call re-connection in accordance with the present invention. In accordance with the first and second embodiments, preferably only the CCN 38 is responsible for initiating call re-connection. In accordance with the third embodiment, either one of the CCN 38 and IVR 50 may bear this onus. The CCC 58 may be associated with any number of service termination equipment (call centers, voice servers, etc.), of one or more locations, departments, services, or even companies, and consequently may handle multiple queues for respective calls awaiting respective categories of services. In accordance with the second embodiment, the CCC 58 comprises an interface with the PSTN 10 that enables it to receive calls, and perform call discrimination. This is preferably performed with automated equipment that is not necessarily equipped to provide subsequent service for the call, but rather serves as a centralized reception for the callers to the called number. The CCC 58 may be further adapted to receive caller supplied information used for call discrimination, and perform call discrimination prior to determining availability of resources for respective calls.

Figure 2A:
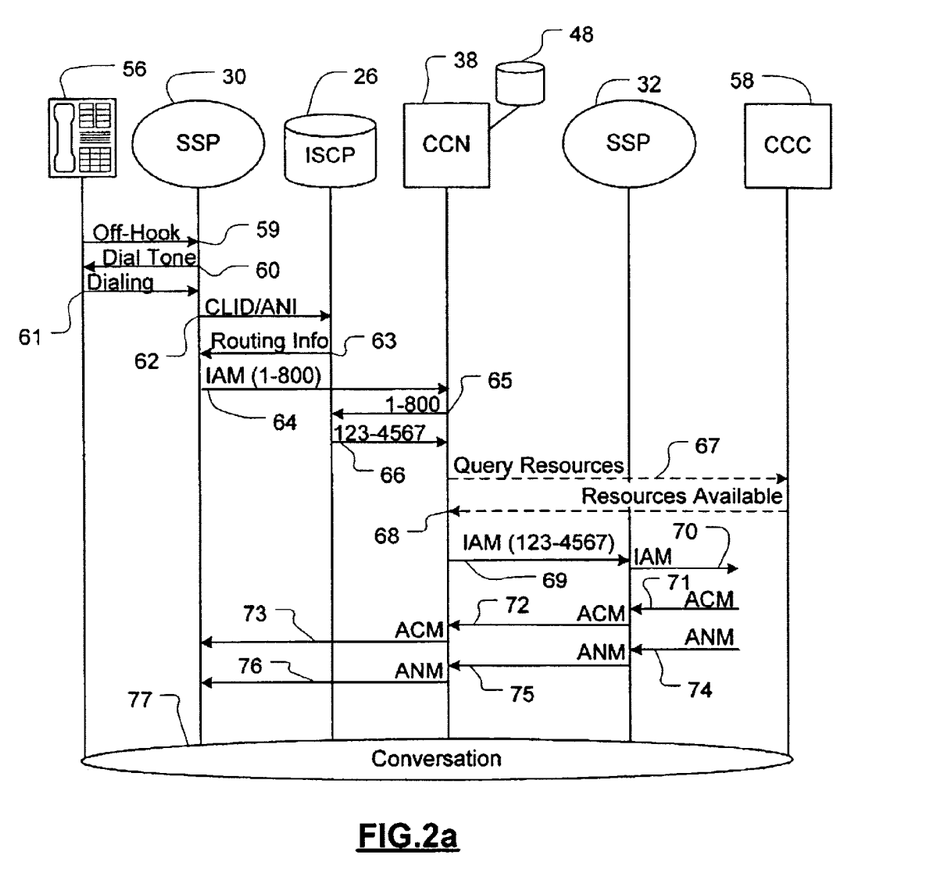
FIGS. 2a and 2b are call progress diagrams showing principal steps involved in respective call treatments of a call when resources are, and are not, available at a service provider's facilities, in accordance with one embodiment of the invention.
Figure 2B:
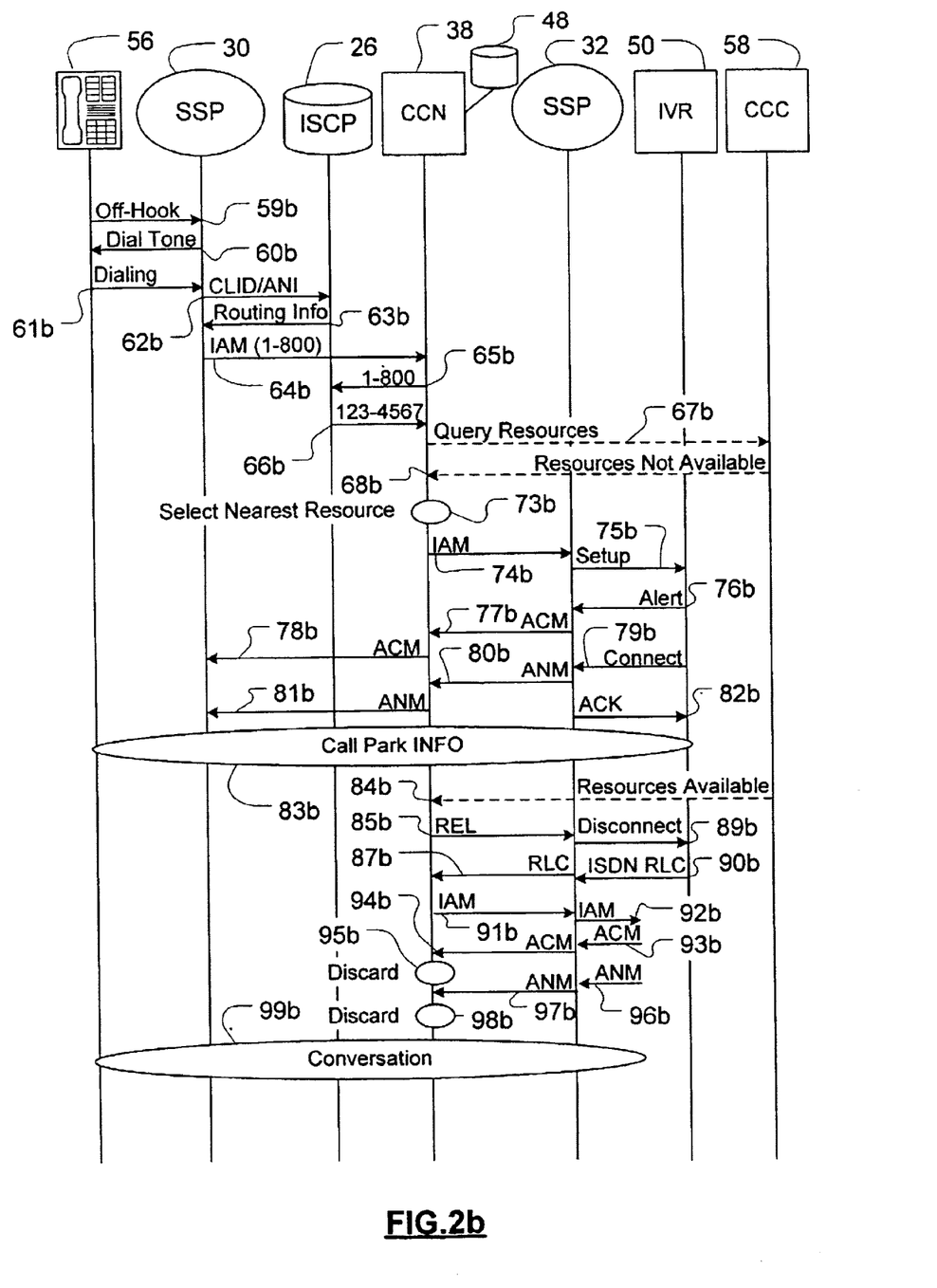

FIG. 2*a* is a call progress diagram showing the principal steps involved in the call treatment of a call initiated from telephone 56, in accordance with a first embodiment of the invention. As shown in FIG. 2*a*, a caller using telephone 56 takes the telephone off-hook (step 59) to place a 1-800 call. When the SSP 30 detects the off-hook condition, it applies a dial tone (step 60) to the calling party's subscriber line. On hearing the dial tone, the caller dials a 1-800 number (step 61). Translation tables in the SSP 30 identify the dialed number as a 1-800number and instruct the SSP 30 to send a Transaction Capabilities Application Part (TCAP) query message (step 62) to ISCP 26. The query message contains the 1-800 number and Calling Line Identification (CLID) or Automatic Number Identification (ANI) information. On receipt of the query message, the ISCP 26 translates the 1-800 number, and returns routing information to the SSP 30 (step 63) that includes, for example, a Carrier Identification Code (CIC) used to force the call to an EISUP trunk in the LCA 12 (FIG. 1). Upon receipt of the routing information, the SSP 30 routes the call onto the EISUP trunk 28 (FIG. 1) by formulating an ISUP-Initial Address Message (IAM), and sending the IAM over the call control signaling network to the CCN 38 (step 64). The CCN 38 receives the IAM, extracts the dialed 1-800 number and Calling Line Identification (CLID), or Automatic Number Identification (ANI) from the IAM, and launches a query to the ISCP 26 to obtain routing information for the call (step 65). The ISCP 26 translates the number and returns (in step 66) a directory number (123-4567 in this example) that can be used to complete the call to service termination equipment (CCC 58, FIG. 1). As is known in the art, the ISCP 26 is adapted to provide different TCAP responses to substantially the same TCAP query messages, in dependence upon an origin of the message. In this way the directory number is returned to the CCN 38, and the CIC is returned to the SSP 30, as in step 63. The CCN 38 then records information about the call and its progress in a call progress table that is maintained in the memory 48. Table 1 illustrates one example of a call progress table:

TABLE 1

| Calling Number | Serial Number | Trunk ID | Routing Information | Service Discrimination | Call Park | Call Center Connection |
|---|---|---|---|---|---|---|
| CLID or ANI | Unique Number | PC CIC | Number | 0 | 0 | 0 |

Each row in the call progress table is associated with one call and includes, for example, fields for recording a Calling Number, (the Calling Line Identification (CLID) or Automatic Number Identification (ANI) information normally available in IAMs); a unique Serial Number generated in any known way by the CCN 38 to permit tracking/referencing of the call, especially if the CLID or ANI information is unavailable or not unique, the Unique trunk ID, which includes the Destination Point Codes and CIC number; and, information about a status of the call. Flags are used to simplify the tracking of a status of the call (e.g. Service Discrimination, Call Park and Call Center Connection). This particular example illustrates that the call has just been routed to the EISUP trunk 28 and has not yet been forwarded to a service resource for service discrimination. A value of "0" indicates that the status of the call has not passed through the service discrimination, call park or service center stages.

The CCN 38 then formulates a query message and sends the query message through the data network 46 (FIG. 1) to the CCC 58 that (in the present embodiment) serves independent queues for a plurality of service termination equipment associated with the 1-800 number (step 67). In this example, the CCC 58 replies to the query (step 68) indicating that resources are available to handle the call. Consequently, the CCN 38 formulates an IAM which it forwards (step 69) through the network to the SSP 32. The SSP 32, in turn, forwards the IAM into the PSTN 10 (step 70) where it is forwarded hop-by-hop through the network in a manner well known in the art, until the call is extended to the service termination equipment serving directory number 123-4567. In accordance with a slight reprise of the illustrated embodiment, the resource available message from the CCC 58 includes a directory number (other than 123-4567) to which the call is to be terminated. In this case the second query to the SCP is not required because the call center software provides that information. As is also well understood, an Address Complete Message (ACM) is returned to the SSP 32 (step 71), which automatically relays the ACM to the CCN 38 (step 72). The CCN 38 subsequently forwards the ACM to the SSP 30 (step 73) and the call connection is completed across the network. When the CCC 58 answers the call, an Answer message (ANM) is transferred back through the signaling network in steps 74–76, following the same path. The call setup is now complete and active (step 77), and conversation can begin between the calling party at telephone 56 and an agent (or automated system) (not shown) connected by the CCC 58.

FIG. 2*b* is a call progress diagram showing the principal steps involved in the call treatment of a call initiated from telephone 56 in accordance with the first embodiment of the invention, when a service termination resource is not available to serve the call. Steps 59 to 67 of FIG. 2*a* are identical with corresponding steps 59*b* to 67*b* of FIG. 2*b*, and their descriptions will not be repeated here. In accordance with the assumed case illustrated in FIG. 2*b*, the response to the resource available query of step 67*b* indicates that no resources are available to handle the call (68*b*). On receipt of the negative response in step 68*b*, the CCN 38 selects a nearest available local service resource at which the call can be parked until service termination resources become available to handle the call. The CCN 38 uses, for example, an exchange code extracted from CLID or ANI as an index in a look-up table to identify the closest available service resource to the calling party (IVR 50, in this example). Table 2 illustrates an exemplary look-up table for determining the nearest service resource with the exchange code and occupancy of local IVRs:

TABLE 2

Table of Local Service Resources

| Local Calling Area | Exchange Code | IVR Capacity | IVR Occupancy | Directory No. |
|---|---|---|---|---|
| #1 | 101, 402, 172, 166, 237 | 30 | 15 | |
| #1 | 222, 310, 311, 410, 611, 567 | 20 | 2 | |
| #2 | 146, 216 226, 228, 229, 231, 236 | 20 | 0 | |
| #2 | 341, 347, 382, 396, 397, 404 | 50 | 4 | |

The local calling area is first determined using a look-up table (not shown) that associates an originating point code (OPC) of the IAM with the LCA 12, which is identified by any suitable code. The LCA 12 and the exchange code, extracted from CLID/ANI information in the IAM, are then used in Table 2 to determine the local service resource (IVR, music termination of a switch, etc.) to which the call should be routed. If the nearest service resource identified in Table 2 has no capacity to accept the call, another IVR (preferably also in LCA 12) is selected. The occupancy information indicates the number of calls currently being handled by each IVR and a delta with the Total IVR capacity can be calculated identifying current availability. For example, the IVRs in the local call area #1 are currently handling 15 and 2 calls, respectively. The CCN 38 can use the current occupancy information of a respective service resource to determine current availability of the respective service resources. In this example, an IVR 50 local to the calling party is selected.

Consequently, the CCN 38 formulates an IAM, which it forwards to the SSP 32 (step 74b). The SSP 32 is prompted by the received IAM to formulate an ISDN-Setup message, which it relays to the IVR 50 (step 75b). The IVR 50 returns an ISDN Alert message (step 76b), which prompts the SSP 32 to formulate an ACM that it returns to the CCN 38 (step 77b). The CCN 38 relays the ACM to the SSP 30 (step 78b), a call path between IVR 50 and the calling party 56 has been established and the calling party 50 hears ringing. When the IVR 50 answers the call, it returns an ISDN Connect message to the SSP 32 (step 79b), which returns an Answer message (ANM) to the CCN 38 (step 80b). The CCN 38, in turn, forwards the ANM to the SSP 30 (step 81b). Meanwhile, the SSP 32 returns an ISDN Acknowledge message (ACK) to the IVR 50 (step 82b), completing the setup of the call. The IVR (step 83b) plays appropriate content to the caller at telephone 56. While a redirect number in the setup message sent in step 75 (that had been included in the IAM formulated by the CCN 38 in step 74b) may be used by the IVR 50 to select a message to play to the calling party in similar embodiments, in this example, the appropriate content (call park information) is generic content used for all callers parked at the local service resource. In yet other embodiments the directory number used to terminate the call at the IVR 50 is used to determine which content is appropriate to the call. As will be explained below with reference to FIG. 4, the content delivered to parked callers can also be tailored to the service subscriber to which the call is placed by sending the message to be played to the caller from the Call Center Controller 58, or otherwise indicating which message is appropriate in a call park message.

Once service termination resources become available at the CCC 58, the CCC 58 sends a data message through the data network 46 to the CCN 38 (step 84b) to inform the CCN 38 that the parked call can now be completed. The message contains enough information to permit the CCN 38 to identify the parked call using Table 1, as described above. Alternatively the CCC 58 may simply indicate a number of calls from an existing queue that can now be completed, if the CCN 38 is adapted to maintain the queues for the parked calls. The CCN 38 responds to the data message by releasing the call segment to the IVR 50. The CCN 38 begins the release sequence by formulating a REL message, which it forwards to the SSP 32 (step 85b). The SSP 32 returns a RLC message, in step 87b. The SSP 32 completes the release of the call by sending an ISDN-Disconnect message (step 89b) to the IVR 50. The IVR 50 returns an ISDN-RLC (step 90b), which indicates that the connection to the IVR 50 is released.

Steps 85b–88b outline one way that a call connection between the CCN 38 and IVR 50 can be released without tearing down the remainder of the call connection, but it is not the only way. As is known in the art, the call can equally be released by setting the line of the IVR 50 of-hook, as long as the CCN 38 has been directed to discard a REL message associated with the call once it arrives at the CCN 38. For example, U.S. Pat. No. 6,075,855, which issued to Christiansen on Jun. 13, 2000, and is incorporated herein by reference, teaches such a method of reconnection of a call in progress.

Meanwhile, the CCN 38 formulates an IAM, which it forwards to the SSP 32 (step 91b). The SSP 32, in turn, forwards the IAM through the PSTN 10 (step 92b), which is advanced to the SSP 36 (of FIG. 1) that serves the call center 58, as explained above. An ACM is returned to SSP 32 (step 93b) and is forwarded (step 94b) to the CCN 38. The CCN 38 discards the ACM (step 95b) to avoid an error at the SSP 30, which deems the call active on the EISUP trunk and is not expecting a call completion message. An ANM is also returned to the SSP 32 (step 96b) after the call center 58 answers the call. The SSP 32 forwards the ANM to the CCN 38 (step 97b), and the CCN 38 discards it (step 98b) for the reason stated above. The call connection to the call center 58 is now complete, and conversation between the caller and a call center agent or automated attendant (not shown) ensues (step 99b).

Figure 3:
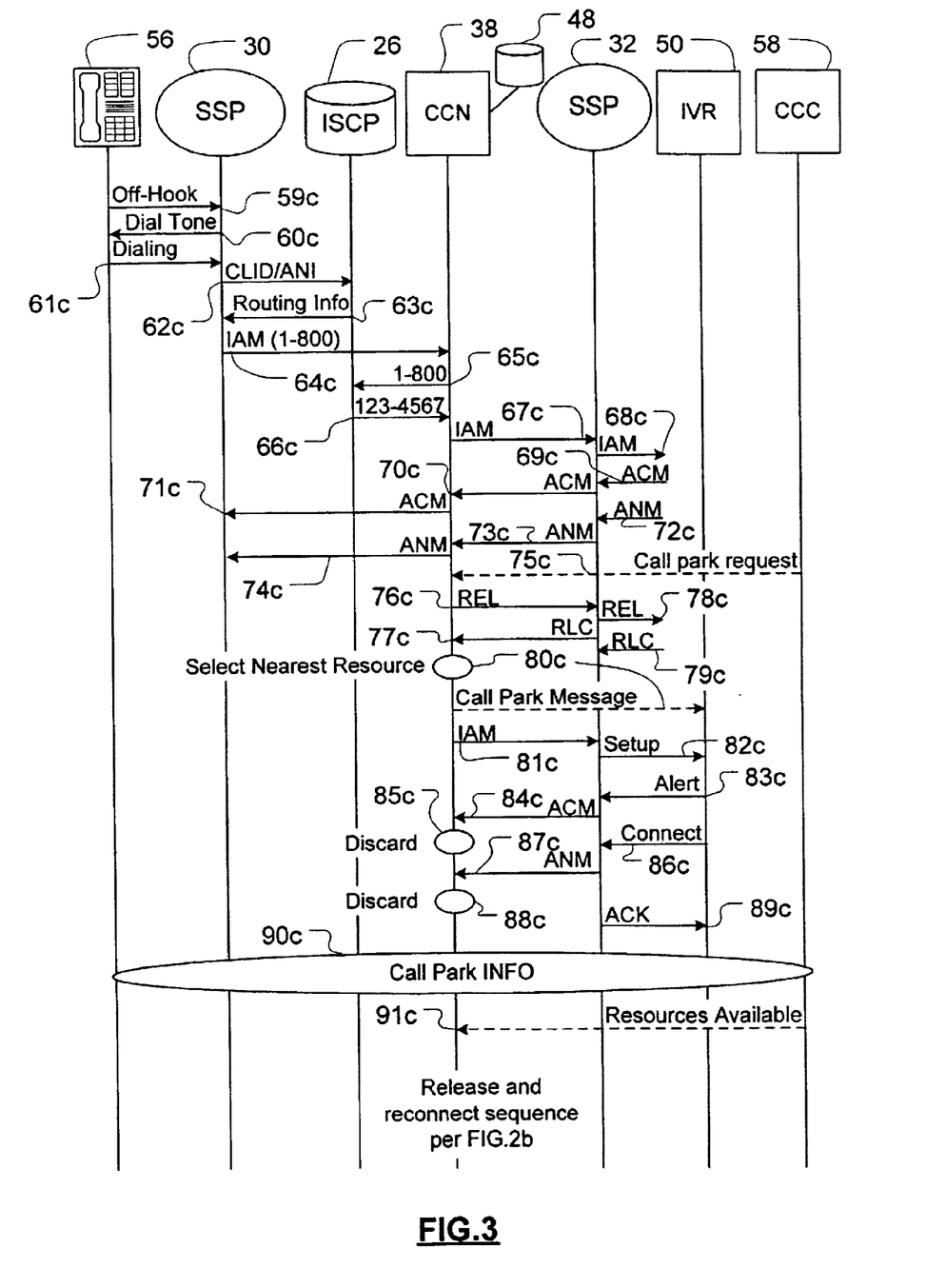
FIG. 3 is a call progress diagram showing principal steps involved in the call treatment and discrimination of a toll-free call that is forwarded directly to the toll call termination equipment, and subsequently parked at a local service resource until service resources become available.

FIG. 3 is a call progress diagram showing the principal steps involved in the call treatment and discrimination in accordance with the second embodiment of the invention. In this embodiment, all calls are passed straight through to the call center 58 for call discrimination. If service termination resources are not available to handle the call, a call park request is sent from the call center 58 to the CCN 38, which releases the call from the call center 58, and parks the call at a an optimum service resource, pending availability of service termination resources to handle the call.

Once again steps 59c to 66c are identical with respective steps of 59 to 66 and 59b to 66b, and descriptions of these will not be repeated here.

In step 67c, the CCN 38 formulates an IAM which it forwards (step 67c) through the network to the SSP 32, the IAM being addressed to the call center 58 that is adapted to perform the call discrimination. The SSP 32, in turn, relays the IAM into the switched telephone network (step 68c) where it is forwarded hop-by-hop through the network, in a manner well known in the art, until the call is extended to the call center 58. As is also well understood, once the IAM is received at an SSP serving the call center 58 (SSP 36 of FIG. 1), assuming resources are available to take the call at the call center 58, an Address Complete (ACM) message is returned hop-by-hop to the SSP 32 (step 69c), which relays the ACM to the CCN 38 (step 70c). The CCN 38, in turn, relays the ACM to the SSP 30 (step 71c) and the call connection is completed across the network. When the call center 58 answers the call, an Answer message (ANM) is transferred hop-by-hop back through the call control signaling network in steps 72c–74c, following the same path. The call setup is now complete and call discrimination is performed by the call center 58, in a manner well known in the art. For example the call center 58 may connect the caller to a service node that plays a menu of options to the caller to determine how the call should be terminated (not shown). In this example, no suitable service termination resource is available to handle the call, and the call center 58 sends a call park request through the data network 46 to the CCN 38 (step 75c).

On receipt of the call park request, the CCN releases the call from the call center 58 by formulating a REL message that it forwards in step 76c to the SSP 32. The SSP 32 responds with a RLC message (step 77c) and formulates a REL message that it forwards through the switched telephone network (step 78c) to complete the release of the call. A RLC is returned to the SSP 32 (step 79c) and the release of the connection is completed in a manner well understood in the art.

Meanwhile, the CCN 38 consults its Table 2, for example, to locate a local service resource where the call can be parked (step 80c), and forwards a call park message to the selected IVR 50, advising the IVR 50 of a call that will be parked there, and indicating which message to play to the calling party (also in step 80c). After the closest available service resource has been located, the CCN 38 formulates an IAM and sends it (in step 81c) to the SSP 32 to connect the caller to the local service resource (IVR 50 in this example). The SSP 32 responds by sending an ISDN-Setup message to the IVR 50 (step 82c). The IVR 50 returns an ISDN-Alert message in step 83c, which causes the SSP 32 to return an ACM (step 84c) to the CCN 38. The CCN 38 discards it (step 85c) for reasons detailed above. Meanwhile, the IVR 50 answers the call and sends an ISDN-Connect (step 86c) to the SSP 32, which subsequently returns an ANM (step 87c) to the CCN 38. The CCN 38 likewise discards the ANM, in step 88c. Call setup is completed when the SSP 32 sends an ISDN-Acknowledge message to the IVR 50 in step 89c.

As previously explained, call park content is played to the calling party (step 90c) until service termination resources become availability. When an agent becomes available, the call center 58 sends a data message to the CCN 38 (step 91c), which triggers a release and reconnect sequence as described above in steps 85b–99b with reference to FIG. 2b.

FIG. 4 is a call progress diagram showing the principal steps involved in the call treatment and discrimination of a toll-free call initiated from telephone 56, in accordance with the third embodiment of the invention. Steps leading to the CCN 38 receiving a directory number from the ISCP 26 in step 112, remain the same as corresponding steps of FIGS. 2a–3, and will not be repeated herein.

In step 114, a nearest service resource with free capacity is selected by the CCN 38, and an IAM is forwarded to the selected service resource (IVR 50). In a manner known in the art the routing number in the received IAM is replaced with the directory number of the selected service resource and forwarded to the SSP 32 (step 116). On receipt of the IAM, the SSP 32 forwards an ISDN-setup message (step 118) over a PRI channel of an ISDN trunk 52 to the IVR 50. The IVR 50 responds to the Setup message by returning an Alert message (step 120) to the SSP 32. On receipt of the Alert message (step 120), the SSP 32 sends an Address Complete (ACM) message (step 122) to the CCN 38, which relays the received ACM to the SSP 30 (step 124). Meanwhile, the IVR 50 forwards a Connect message (step 126) to the SSP 32 to signal that it has answered the call. The SSP 32 responds by formulating an ANM message (step 128) addressed to the CCN 38. The CCN 38 forwards the ANM message (step 132) to the SSP 30. Meanwhile, the SSP 32 acknowledges the Connect message (step 126) from the IVR 50 by returning an ISDN acknowledge (ACK) message (step 130) to the IVR 50. This advises the IVR 50 that a connection with the calling party is complete. The CCN 38 forwards Service Information through the data network 46 (FIG. 1) to the IVR 50, to provide the IVR with information about the service subscriber (1-800 number), for example. Alternatively, the service subscriber information can be passed in a Redirect Number field of the IAM, or the like. The IVR 50 uses the service subscriber information to select content to be presented to the calling party 56 and interacts (step 136) with the calling party 56 to discriminate a type and/or level of service required for the call. After the IVR 50 has obtained the required information from the caller, as will be explained below with reference to FIG. 7, the IVR 50 passes the routing information (step 138) back through the data network to the CCN 38. The CCN 38 uses the routing information to determine the availability of resources at the call termination selected by the caller's interaction with the IVR 50 (step 140). In accordance with the illustrated embodiment, the CCN 38 determines the availability of resources at the call termination, which may be a call center, using a call center availability table (Table 3). Table 3 is stored and maintained in the memory 48 of the CCN 38. An example of a call center availability table is shown below:

TABLE 3

| Directory Number | | | |
|---|---|---|---|
| Ext. 1 | Ext. 2 | ... | Ext. N |
| 0 | * | ... | 1 |

Table 3 includes a "Directory Number" and a variable number of flags associated with respective extensions, e.g. "Ext. 1", "Ext. 2, . . . "Ext. N". The directory number is used to access the call center. The extension flags are used to track the availability of extensions used to field calls to the call center. If an extension field is set to any value other than 0 or 1, "*", for example, as shown for Ext. 2 in Table 3, there is no agent at the extension, or the extension is unavailable for some other reason. Such extensions are ignored in determining capacity at the call center. The status of extensions stored in Table 3 is maintained by an administrator at the respective call centers using a remote maintenance interface of a type well known in the art. This information can also be obtained through an availability query to the call center control node 58 that represents the call center, through data network 46. If all calls to the call center are not relayed through the CCN 38, this alternative manner of obtaining the information may be required.

In accordance with an alternative embodiment, the IVR 50 is adapted to interface with the call center control node 56 to determine availability of resources at a suitable service termination to handle the call. In this alternative embodiment, once resources are available to handle the call, the IVR 50 sends a message to the CCN 38, directing the CCN 38 to release and reconnect the specific call to the available resource. This relieves some processing and messaging demand on the CCN 38.

It is assumed in the example illustrated in FIG. 4, that the resources are initially available to handle the call. The CCN 38 therefore formulates a release message (REL) (step 142), which is forwarded to the SSP 32. On receipt of the REL message, (step 142), the SSP 32 formulates an ISDN-Disconnect message (step 144), which it forwards to the IVR 50. On receipt of Disconnect message, the IVR 50 returns an ISDN-Release Complete (RLC) message (step 146) to the SSP 32, thus releasing all resources associated with the call placed to the IVR 50. Meanwhile, SSP 32 has formulated an RLC message that is sent (step 148) to the CCN 38. The CCN 38 then formulates an IAM message (step 152) using the routing information that was received from the IVR 50 in the step 138. The IAM message is forwarded (step 154) through the switched telephone network to an SSP that serves the call center, using standard call routing techniques. On receipt of the IAM, the SSP formulates an ACM, which is returned through the network to the CCN 38 (step 156). On receipt of the ACM message, the CCN 38 discards it (step 158). Meanwhile, the SSP formulates an ANM message that is forwarded (step 160) to the CCN 38. The CCN 38 discards the ANM message (step 162).

The CCN 38 then, in step 164, updates the resource availability table (Table 3) as the conversation begins (step 168) between the caller and call center. After the conversation is completed, for example, the agent handling the call at the call center goes on-hook. The on-hook condition is detected at the SSP serving the call center (not shown). In response, the SSP formulates and issues a REL message, which is propagated through the PSTN 10 to the CCN 38 (step 170). When the CCN 38 receives the REL message, it returns a RLC message (step 174) and relays the REL message to the SSP 30 (step 172), which returns an RLC (step 176). Thereafter, the SSP 30 applies a disconnect tone (step 180) to the telephone 56 line, which prompts the caller to return the telephone 56 on-hook (step 182). In step 178 the resource availability table (Table 3) is revised in light of the availability of the call center.

FIG. 5 is a call progress diagram showing an example of the principal steps involved in the call treatment and discrimination of a toll-free call initiated from telephone 56 when the resources are not available at a dialed call center, and the calling party decides not to hold. Steps 202–240 leading to service discrimination and a determination of availability of the resources to handle the type and level discriminated for the call, remain the same as corresponding steps 102–140 of FIG. 4, and will not be repeated herein.

As shown in FIG. 5, the CCN 38 determines that no suitable resource is available at the selected call termination(s) to handle the call. Consequently the CCN 38 issues a call park message (step 242) through data network 46 to the IVR 50. The IVR 50 responds to the call park request by playing a recorded call park message. Preferably the recorded call park message is associated with at least the 1-800 number, if not also with the call discrimination (step 244). In some cases, the call park information duplicates what the caller would hear if on hold at the service subscriber's call termination equipment. It is assumed in the present case that the caller decides to end the call rather than wait. Consequently, the caller's telephone 56 is placed on-hook (step 248). On receipt of the on-hook signal, the SSP 30 formulates a REL message (step 250), which is forwarded to the CCN 38, and the CCN 38 relays the REL message to the SSP 32 (step 252). On receipt of the REL message (step 252), the SSP 32 formulates an ISDN-REL message, which it forwards to the IVR 50 (step 246). Meanwhile, the CCN 38 and the SSP 32 have returned RLC messages (steps 256 and 258, respectively). On receipt of the ISDN REL message (step 256), the IVR 50 releases the call, and returns an ISDN Disconnect message (step 254) to the SSP 32. The CCN 38 also updates resource availability (step 260) to indicate that the IVR 50 is serving one less caller.

FIG. 6 is a call progress diagram showing an example of the principal steps involved in the call treatment and discrimination of a toll-free call initiated from telephone 56 when the resources at the call center are not available, but the caller decides to hold until the resources at the call center become available. Steps 302 344 are the same as corresponding steps 202–244 of FIG. 5, and will not be repeated here.

As shown in FIG. 6, the CCN 38 periodically checks the availability of resources by monitoring Table 3, until resources become available to handle the call. If a plurality of callers is on hold for the same service provider or class of service, the CCN 38 preferably selects the caller that has been on hold longest within each customer category, each time a resource at the service subscriber becomes available to handle a call. Consequently, a time stamp is preferably associated with each parked call to ensure that the CCN 38 is enabled to select the correct one of a plurality of parked calls. Of course in other embodiments the queue may be managed by a Call Center Control Node 58.

Once a resource becomes available, the CCN 38 then formulates a REL message (step 346), and forwards it to the SSP 32, to release the calling party 56 from the IVR 50. On receipt of the REL message, the SSP 32 formulates an ISDN-Disconnect message (step 348), which it forwards to the IVR 50. On receipt of the Disconnect message, the IVR 50 returns an ISDN-RLC message (step 350) to the SSP 32, thus releasing all resources associated with the call placed to the IVR 50. Meanwhile, the SSP 32 formulates a RLC message that it forwards (step 352) to the CCN 38.

Meanwhile, the CCN 38 formulates an IAM message (step 356) containing the routing information received in the routing information message (step 338). The IAM is forwarded (step 358) through the PSTN 10 toward an SSP that serves the available resource. The SSP subsequently formulates an ACM that is propagated through the network to the CCN 38 (step 360). The CCN 38 discards the ACM (step 362). Meanwhile, the SSP formulates an ANM indicating that the line is answered at the call center. The ANM is likewise propagated through the PSTN 10 along the switches of the call connection until it is forwarded (in step 364) to the CCN 38. The CCN 38 likewise discards the ANM (step 366) and updates the resource availability table associated with the selected service termination resource (step 368). The connection between the caller's telephone 56 and the selected service termination resource is completed, (step 370) and conversation ensues between the caller and a call center agent (not shown). After the conversation is completed, the connection is released in steps 372–384, which are substantially the same as steps 170–182 as described above.

Figure 7:
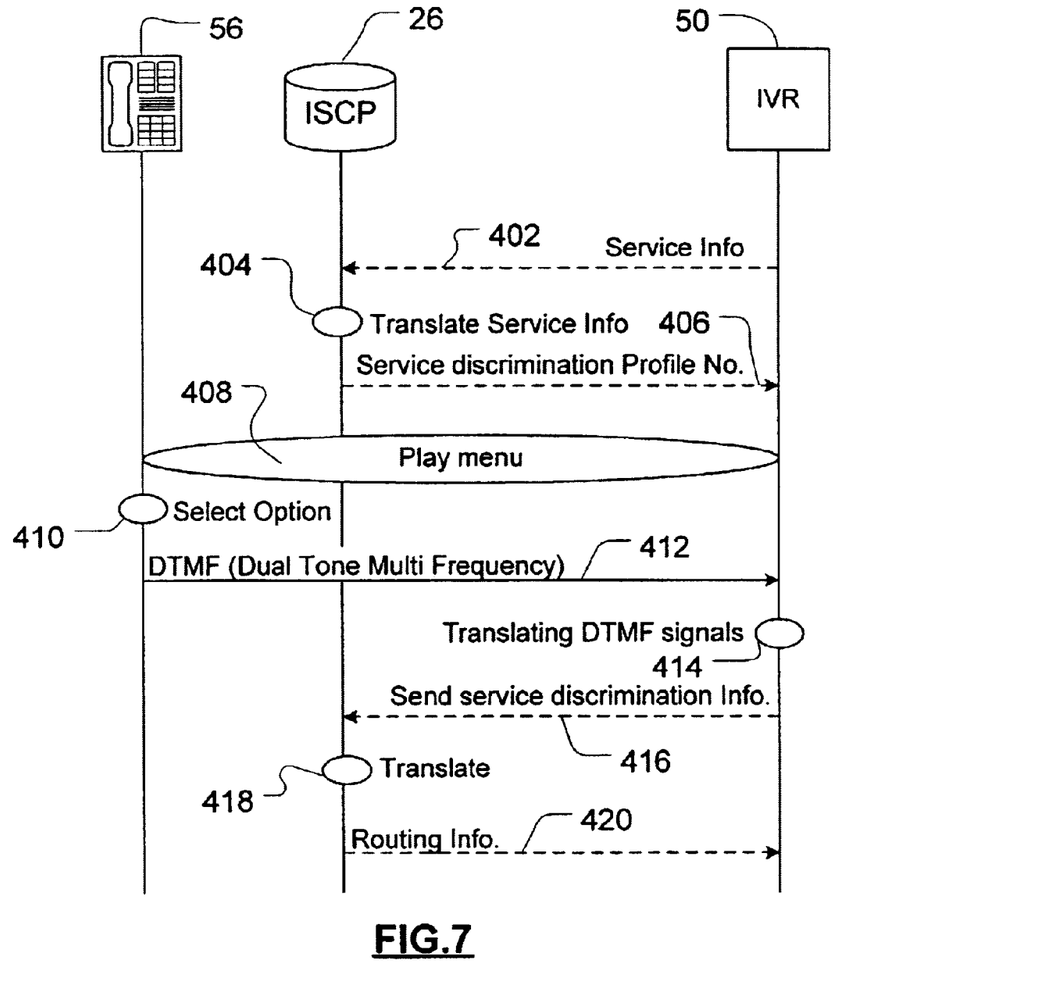
FIG. 7 is a progress diagram illustrating an example of service discrimination, in accordance with the invention.

FIG. 7 is a schematic process flow diagram illustrating an example of service discrimination. As shown in FIG. 7 a caller using telephone 56 interacts with IVR 50. As a result of the service discrimination, the IVR provides complete routing information to the CCN 38, which completes a call connection between the caller and a toll-free service provider call facility, such as a call center or an enterprise IVR 50. As described above, during call completion to the IVR 50, the IVR 50 receives service information that comprises (if available) CLID or ANI and preferably also a number that was dialed by the caller using telephone 56 (either in a redirecting number field of the IAM used to initiate the call completion, or in a data message from the CCN 36). The IVR 50 sends a service information query message (step 402) to the ISCP 26. On receipt of the service information query message, the ISCP 26 translates (step 404) the information received, and returns an identifier of a service discrimination profile to the IVR 50 (step 406). The service discrimination profile is used to tailor the service discrimination to the requirements of the service provider to which the call is directed. For example, the service discrimination profile identifier provides a number used as an index to retrieve a pre-recorded menu of options that are played to the caller in a manner well known in the art. In accordance with alternative embodiments, any enterprise database may be substituted for the ISCP 26 in this particular role. On receipt of the service discrimination profile identifier, the IVR 50 retrieves the appropriate service profile and plays (step 408) an associated pre-recorded message to the caller. The caller, using a keypad of the telephone 56, responds to the prerecorded message by selecting an option (step 410) and generating (in step 412) Dual Tone Multi-Frequency (DTMF) signals. The DTMF signals are converted into digital information and translated (step 414) by the IVR 50 into service discrimination information. As will be evident any number of iterations of steps 408 to 412 using different messages to prompt the caller for still more service discrimination options may be used. The IVR 50 sends the service discrimination information (step 416) to the ISCP 26. On receipt of the information, the ISCP 26 translates it into routing information (step 418) and returns (step 420) the routing information to the IVR 50.

The invention therefore provides a method and system for providing local call treatment that permits calls to be parked in the caller's local calling area (or a nearest LCA) pending availability of service termination resources, and optionally perform service discrimination that permits service availability to be determined before calls are extended across the network. Parked calls therefore only tie up switch resources close to the caller freeing up network and enterprise capacity that would otherwise be consumed. Call distributions are handled more efficiently and single-number calling to a plurality of distributed call centers or call agents is enabled. Furthermore, the invention lessens need for installation and maintenance of call handling equipment at call centers and enterprise IVRs, as calls are not parked there. Since the call center only handles calls for which call agents are available, fewer Public Branch Exchange or Call center controller circuits are required. Savings are therefore realized in the network as well as at each call center served by the apparatus, in accordance with the invention.

For clarity of illustration the invention has been described with reference to an explicit network configuration, however it should be understood that other network configurations will work equally as well. For example, service nodes such as IVR 50 can be connected to the switched telephone network using a Small Message Desk Interface (SMDI), rather than an ISDN trunk. Another example would be providing identical functionality in a mobility network or between a mobility network and the PSTN. The embodiments of the invention described above are therefore intended to be exemplary only, and the scope of the invention is intended to be limited solely by the scope of the appended claims.

We claim:

1. A method for providing call treatment discrimination for calls to a specific telephone number in a switched telephone network, comprising steps of:
    configuring the network to route call establishment messages addressed to the directory number to a call control node that is a virtual switching node in the telephone network;
    determining at the call control node, on receipt of a call establishment message associated with a call to the directory number, a service resource to which the call should be routed; and
    sending into the network from the call control node a call control message to route the call to the service resource.

2. A method as claimed in claim 1 wherein the step of determining further comprises a step of querying an enterprise database that maintains an availability record of service termination equipment associated with the directory number, to determine if a termination service equipment is available to serve the call.

3. A method as claimed in claim 2 further comprising a step of forwarding the call to the service termination equipment if the termination service equipment is available.

4. A method as claimed in claim 2 further comprising a step of parking the call at a local service resource if no service termination equipment is available.

5. A method as claimed in claim 4 further comprising a step of receiving a data message from the enterprise database advising that the service termination equipment has become available.

6. A method as claimed in claim 5 further comprising a step of releasing the parked call and reconnecting the call to the service termination equipment.

7. A method as claimed in claim 4 further comprising steps of:
    determining at where the call should be terminated; and
    sending call routing information to the call control node to permit the call to be routed to the service termination equipment.

8. A method as claimed in claim 7 wherein the step of sending call routing information comprises a step of relaying the call routing information to the call control node through a data network in a data message.

9. A method as claimed in claim 7 further comprising a step of determining a current availability of service termination resources at the service termination equipment on receipt of the routing information at the call control node.

10. A method as claimed in claim 9 further comprising a step of formulating a call control message at the call control node to release the call from the local service resource and establish a new call to the service termination equipment on determining that service termination resources are currently available at the service termination equipment to handle the call.

11. A method as claimed in claim 10 further comprising a step of sending a call park message to the local service resource to notify the local service resource that the call will not be immediately forwarded to a termination on determining that service termination resources are not currently available at the service termination equipment to handle the call.

12. A method as claimed in claim 11 further comprising a step of informing the caller from the local service resource that no service termination resources are currently available to handle the call and presenting the caller with an option of holding until service termination resources become available to handle the call.

13. A method as claimed in claim 12 further comprising a step of playing for the caller pre-recorded audio information selected by a subscriber associated with the service termination while the call is parked at the termination.

14. A method as claimed in claim 11 further comprising a step of using the call routing information and information extracted from call control messages used to establish the call to the call control node to create a category and time stamp for each call served by the call control node that is parked at a local service resource.

15. A method as claimed in claim 14 wherein the step of determining at the local service resource where the call should be terminated comprises steps of:
    playing an audio message to prompt the caller to supply some information; and
    receiving the information from the calling party; and
    wherein the step of using further comprises a step of using the information from the calling party to create the category for the call.

16. A method as claimed in claim 15 further comprising steps of:
    selecting a next call from among a plurality of calls that are parked at local service resources based on a category, and a time stamp associated with the calls, on determining at the call control node that resources have become available at the service termination equipment; and formulating a call control message at the call control node to release the call from the local service resource and reroute the call to the service termination equipment.

17. The method as claimed in claim 1 wherein the step of configuring the switched telephone network further comprises a step of designating a plurality of Integrated Services Digital Network-User Part (ISUP) trunks in the switched telephone network as enhanced ISUP trunks having linksets and routesets associated with the call control node so that call control messages associated with the ISUP trunks are routed over a common channel signaling network associated with the switched telephone network to the call control node.

18. The method as claimed in claim 17 further comprising a step of routing calls to the directory number to the ISUP trunks using standard translation tables in switching points in the switched telephone network.

19. The method as claimed in claim 18 further comprising a step of using standard translation tables to trigger a query to an intelligent service control point (ISCP) to obtain the call routing information.

20. The method as claimed in claim 17 further comprising a step of configuring the call routing information as a carrier identification code.

21. A system for providing call treatment discrimination for calls to a selected directory number in a switched telephone network, comprising:

at least one local service resource associated with each local calling area in the switched telephone network, the at least one local service resource being adapted to communicate with callers that place the calls;

a call control node having a memory for storing a list containing identifiers of each of the local service resources in the switched telephone network, and a current occupancy of each of the local service resources; and at least one enhanced integrated services digital network-user part (EISUP) trunk in each local calling area, the EISUP trunk having associated linksets and routesets for routing call control messages associated with the calls to the call control node.

22. A system as claimed in claim 21 wherein the at least one local service resource associated with each local calling area in the switched telephone network is an Interactive Voice Response Unit.

23. A system as claimed in claim 21 wherein the call control node is a virtual switching node in a call control network of the switched telephone network associated with the at least one EISUP trunk and a physical node in the call control network of the switched telephone network.

24. A system as claimed in claim 23 wherein the call control node further comprises a data-messaging interface for communicating with the local service resource and the service termination equipment via a data network through which data messages are sent.

25. A system as claimed in claim 21 wherein the call control messages are common channel signaling messages.

26. A system as claimed in claim 25 wherein the call control messages are Signaling System 7 messages.

27. A system as claimed in claim 21 wherein the selected calls are toll-free calls.

28. A system as claimed in claim 21 wherein the local service resource is adapted to serve as a call park for calls that cannot be terminated immediately because there are no call termination equipment resources currently available to handle the call.

29. A system as claimed in claim 28 wherein the local service resource is adapted to play a prerecorded audio message at the local service resource to a caller who is waiting for resources to become available at the call termination.

30. A system as claimed in claim 21 wherein the call control node further includes a memory for storing a record of a status of each call in progress.

31. A system as claimed in claim 30 wherein the memory is further adapted to store an indicator of whether the call is parked, pending the availability of service termination resources at the service termination equipment.

32. A system as claimed in claim 31 wherein the memory is further adapted to store an indicator of the time at which each parked call was assigned a call parked status.

33. A method for providing call treatment discrimination for selected calls in a switched telephone network, comprising steps of:

selecting a directory number for which calls are to receive local call treatment discrimination;

configuring the network to route call control messages associated with the directory number to a call control node that is a virtual switching node in the switched telephone network;

forwarding the calls from the call control node to service termination equipment associated with the directory number; and sending a data message from the service termination equipment to instruct the call control node to release the call from the service termination equipment and park the call at a local service resource in an event that service termination resources are not available to serve the call at the service termination equipment.

34. The method as claimed in claim 33 wherein the step of forwarding the calls comprises steps of:

receiving an Initial Address Message (IAM) at the call control node, the IAM including the directory number;

extracting information from the IAM and storing the information in a memory associated with the call control node; and forwarding the IAM into the switched telephone network to route the call to the service termination equipment.

35. The method as claimed in claim 33 wherein the step of sending a data message comprises steps of:

determining at the service termination equipment whether service termination resources are available to serve the call;

formulating the data message to the call control node to instruct the call control node to release the call from the service termination equipment; and sending the data message through the data network to the call control node.

36. The method as claimed in claim 35 wherein the step of determining at the service termination equipment whether service termination resources are available to serve the call includes steps of:

playing a menu of options to a calling party associated with the call to determine what service termination resource is required to serve the call; and checking the service termination resources to determine whether the selected service termination resource is available to serve the call.

37. The method as claimed in claim 33 further comprising steps of:

receiving the data message at the call control node;

extracting information from the data message to identify the call to be released from the service termination equipment;

formulating a common channel signaling Release (REL) message at the call control node and forwarding the REL message into the switched telephone network to release the call from the service termination equipment; and formulating and Initial Address Message (IAM) at the call control node and forwarding the IAM into the switched telephone network to connect the call to a local service resource at which the call is to be parked.

38. The method as claimed in claim 37 further comprising steps of:

sending a data message from the call control node to the local service resource to inform the local service resource of an identity of a service subscriber associated with the call that is being parked; and selecting content to be played to the calling party at the local service resource using the identity of the service subscriber.

39. The method as claimed in claim 37 further comprising steps of:

receiving a subsequent data message from the call termination equipment advising that service termination resources are available to serve the call;

formulating a REL message at the call control node and forwarding the REL message into the switched telephone network to release the call from the local service resource; and formulating an IAM at the call control node and forwarding the IAM into the switched telephone network to reconnect the call to the call termination equipment.

* * * * *